United States Patent Office 3,360,560
Patented Dec. 26, 1967

3,360,560
COMPLEXES OF TETRACYCLINES AND
DERIVATIVES THEREOF
Frank L. Weisenborn and J. S. Paul Schwarz, Somerset,
N.J., assignors, by mesne assignments, to E. R. Squibb
& Sons, Inc., New York, N.Y., a corporation of
Delaware
No Drawing. Filed Jan. 8, 1965, Ser. No. 424,217
5 Claims. (Cl. 260—559)

ABSTRACT OF THE DISCLOSURE

This invention relates to complexes of the general formula

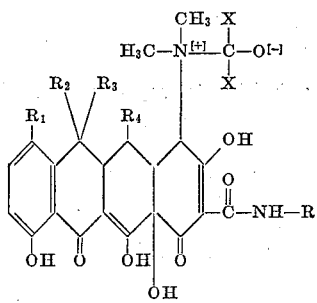

wherein R is hydrogen or halo, $R_2$ is hydrogen or lower alkyl, $R_3$ is hydrogen or hydroxy and together $R_2$ and $R_3$ is lower alkylene, $R_4$ is hydrogen or hydroxy, R is hydrogen of pyrrolidinomethyl; and each X is lower alkyl, phenyl or trihalomethyl provided that at least one X is trihalomethyl. These complexes possess antibiotic activity and are effective for such purposes against such microorganisms as *Staphylococcus aureus* 209 P, *Escherichia coli* and *Mycobacterium tuberculosis*.

---

This invention relates to new and useful complexes. More particularly, this invention relates to complexes of the general formula

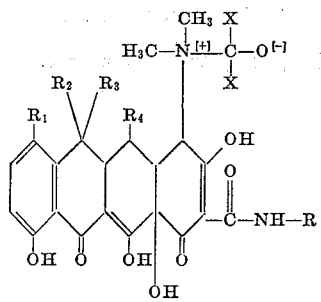

wherein $R_1$ may be hydrogen or halo (e.g., chloro); $R_2$ may be hydrogen or lower alkyl (e.g., methyl); $R_3$ may be hydrogen or hydroxy; and together $R_2$ and $R_3$ is lower alkylene (e.g., methylene); $R_4$ may be hydrogen or hydroxy; R may be hydrogen or pyrrolidinomethyl; and each X may be alkyl, aryl or perhaloalkyl; provided that at least one X is perhaloalkyl and preferably perfluoroalkyl.

The novel complexes of this invention possess antibiotic activity and are effective for such purposes against such microorganisms as *Staphylococcus aureus* 209P, *Escherichia coli* and *Mycobacterium tuberculosis;* the dosage and/or concentration determined by the particular complex employed and the requirements of the patient.

The novel complexes of this invention may be prepared in accordance with the process of this invention beginning with starting material of the formula

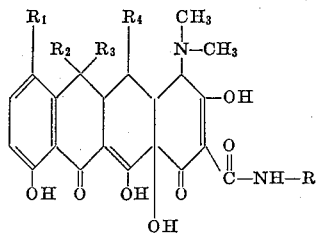

wherein R, $R_1$, $R_2$, $R_3$ and $R_4$ are as hereinbefore defined. Among the starting materials which may be employed in the practice of this invention may be included, inter alia, tetracycline; chlortetracycline; 6 - demethylchlortetracycline; oxytetracycline; 6 - deoxy - 6 - demethyltetracycline; 6 - demethyltetracycline; 6 - methylenetetracycline; pyrrolidinomethyltetracycline; and other like compounds.

The starting material of the instant invention are first dissolved or suspended in an inert, anhydrous solvent, such as 1,2 - dimethoxyethane, tetrahydrofurane, dioxane, ethyl acetate, chloroform and the like and are then treated with a polyhalogenated oxygen-containing hydrocarbon such as polyhalogenated ketone, such as a polyfluorinated ketone, for example, hexafluoroacetone, dichlorotetrafluoroacetone, trifluoromethylphenyl ketone, trifluoroacetone and other like ketones to yield the novel complexes of the instant invention.

Example 1

Anhydrous tetracycline (4.94 g.) is dissolved in 15 ml. of 1,2 - dimethoxyethane in a 250 ml. flask. Hexafluoroacetone is bubbled through this solution until the vapors fill the flask. The flask is stoppered and the contents are stirred magnetically. After one hour the product crystallizes, forming a thick yellow mass.

The crystals are collected on a filter and washed sparingly with additional cold 1,2 - dimethoxyethane. The yield is 6.64 g. (97.2%), $[\alpha]_D$—187.5° (MeOH). Further purification can be achieved by recrystallization from chloroform or methanol-chloroform. The analytical sample has the following properties:

Melting point: decomposes above 190° in an evacuated capillary.
U.V.: (95% EtOH) 269 m$\mu$ ($\epsilon$=19,000), 362 m$\mu$ ($\epsilon$=16,500).
$[\alpha]_D^{29}$(—)108°±0.5° (c. 1.6, dimethoxyethane).
$[\alpha]_D^{29}$(—)189°±0.5° (c. 1.3 methanol).
Microanalysis: Calc'd for $C_{25}H_{24}O_9N_2F_6$: F, 18.67; N, 4.59; M.W. 610. Found: F, 18.08; N, 4.38; N.E. (HClO$_4$) 597.
NMR (pyridine) C–6 methyl 8.28$\tau$ singlet, C–4 hydrogen 5.62$\tau$ broad singlet, C–4 dimethylamino 6.82$\tau$ singlet.

Example 2

Tetracycline (444 mg., 1.00 mmoles) is dissolved in two milliliters of tetrahydrofuran and treated with sym-dichlorotetrafluoroacetone (199 mg., 1.00 mmoles). The solvent is removed under vacuum and the oily residue is triturated with hexane to convert the complex into a filterable, powdery form. The product is collected on a filter and dried under vacuum at room temperature.

Example 3

Anhydrous 6 - demethylchlortetracycline (0.498 g.) is suspended in 15 ml. of chloroform in a 50 ml. flask. The liquid and void space contained in the flask is saturated with hexafluoroacetone vapor. The flask is stoppered, and the contents are stirred magnetically for sixteen hours. The 6 - demethylchlortetracyclinehexafluoroacetone complex is isolated by removing the chloroform under vacuum.

Similarly, like results are obtained when the process of Example 2 is followed but equivalent amounts of oxytetracycline, 6 - demethyltetracycline, pyrrolidinomethyltetracycline or chlortetracycline are substituted for the 6 - demethylchlortetracycline.

Similarly, like results are obtained when equivalent amounts of dichlortetrafluoroacetone or trifluoroacetone or trifluoromethylphenyl ketone are substituted for hexafluoroacetone.

These complexes are more soluble in organic solvents such as chloroform or ethyl acetate than the starting tetracycline derivative and are detectable as U.V.-absorbing, bioactive spots after paper chromatography using McIlvaines pH 4.5 buffer as stationary phase and ethyl acetate as moving phase.

Example 4

The in vitro antibiotic activity of the novel tetracyclinehexafluoroacetone complex (THFC) of the invention as compared to that of the hydrochloride salt of tetracycline can be seen from the following table:

TABLE 1.—IN VITRO COMPARISON OF ACTIVITY OF TETRACYCLINE HEXAFLUOROACETONE COMPLEX (THF) AND TETRACYCLINE HCl [1]

| Organism | Inoculum Size, cells/ml. | THFC [2] | Tetracycline HCl [2] |
|---|---|---|---|
| Staphylococcus aureus 209P | 10⁶ | 0.22 | 0.23 |
| Staphylococcus aureus 209P | 10³ | 0.05 | 0.04 |
| Staphylococcus aureus 2406 [3] | 10⁶ | >50.0 | >50.0 |
| Staphylococcus aureus 3188 [3] | 10⁶ | >50.0 | >50.0 |
| Escherichia coli 3552 [3] | 10³ | >50.0 | >50.0 |
| Escherichia coli 2975 [3] | 10³ | 1.1 | 1.3 |
| Salmonella schottmuelleri 3850 | 10³ | 0.3 | 0.2 |
| Mycobacterium tuberculosis var BCG | 10⁶ | 1.4 | 1.4 |
| Candida albicans 1539 | 10⁶ | >50.0 | >50.0 |
| Trichophyton mentagrophytes | 10⁶ | >50.0 | >50.0 |

[1] Twofold tube dilution assay.
[2] Minimum Inhibitory Concentration, mcg./ml.
[3] Tetracycline-resistant Strain.

The invention may be variously otherwise embodied within the scope of the appended claims.

What is claimed is:
1. A complex of the formula

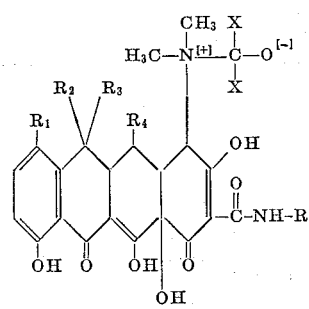

wherein R is selected from the group consisting of hydrogen and pyrrolidinomethyl; $R_1$ is selected from the group consisting of hydrogen and halo; $R_2$ is selected from the group consisting of hydrogen and lower alkyl; $R_3$ is selected from the group consisting of hydrogen and hydroxy; and together $R_2$ and $R_3$ is lower alkylene; $R_4$ is selected from the group consisting of hydrogen and hydroxy; and each X is selected from the group consisting of trihalomethyl, lower alkyl and phenyl, provided that at least one X is trihalomethyl.

2. Tetracycline - hexafluoroacetone complex.

3. 6 - demethylchlortetracycline - hexafluoroacetone. complex.

4. The process of preparing the complexes of claim 1 which comprises reacting a compound of the formula

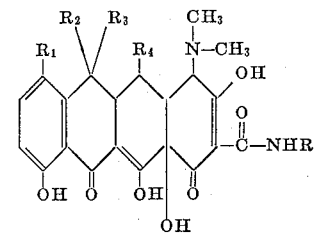

wherein $R_1$, $R_2$, $R_3$ and $R_4$ are as defined in claim 1, in an anhydrous organic solvent with a polyhalogenated ketone.

5. The process of claim 4 wherein the polyhalogenated ketone is selected from the group consisting of hexafluoroacetone, dichlorotetrafluoroacetone, and trifluoromethylphenyl ketone.

References Cited
UNITED STATES PATENTS
3,275,652  2/1966  Martell _____ 260—559

NICHOLAS S. RIZZO, Primary Examiner.

UNITED STATES PATENT OFFICE
CERTIFICATE OF CORRECTION

Patent No. 3,360,560                      December 26, 1967

Frank L. Weisenborn et al.

It is hereby certified that error appears in the above numbered patent requiring correction and that the said Letters Patent should read as corrected below.

Column 2, line 31, after "invention." insert -- The invention may be illustrated by the following examples: --; column 4, line 25, strike out "complex."; line 26, after "hexafluoroacetone" insert -- complex --.

Signed and sealed this 21st day of January 1969.

(SEAL)
Attest:

Edward M. Fletcher, Jr.                      EDWARD J. BRENNER

Attesting Officer                            Commissioner of Patents